April 23, 1963 N. B. WALES, JR Re. 25,373

SEQUENCE READOUT TRANSDUCER FOR ACCOUNTING MACHINES

Original Filed May 9, 1956 5 Sheets-Sheet 1

INVENTOR
NATHANIEL B. WALES, JR.
BY Elmer W. Edwards
AGENT

SEQUENCE READOUT TRANSDUCER FOR ACCOUNTING MACHINES

Original Filed May 9, 1956 5 Sheets-Sheet 2

INVENTOR
NATHANIEL B. WALES, JR.
BY Ernest W. Edwards
AGENT

SEQUENCE READOUT TRANSDUCER FOR ACCOUNTING MACHINES
Original Filed May 9, 1956 5 Sheets-Sheet 3
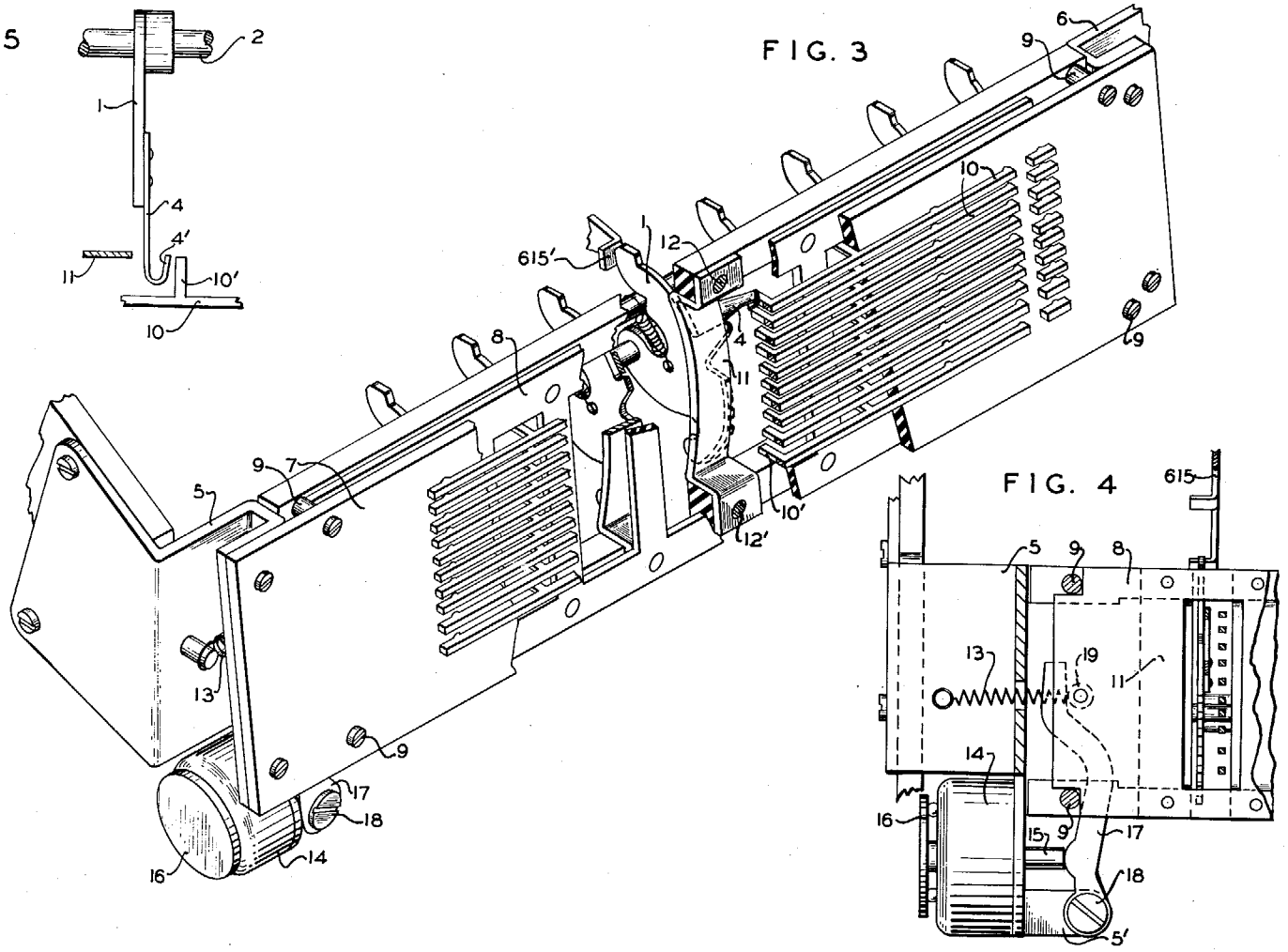
INVENTOR
NATHANIEL B. WALES, JR.
BY Elmer W. Edwards
AGENT

SEQUENCE READOUT TRANSDUCER FOR ACCOUNTING MACHINES

Original Filed May 9, 1956 5 Sheets-Sheet 4

INVENTOR.
NATHANIEL B. WALES, JR.
BY Elmer W. Edwards
AGENT

SEQUENCE READOUT TRANSDUCER FOR ACCOUNTING MACHINES

Original Filed May 9, 1956 5 Sheets-Sheet 5

INVENTOR.
NATHANIEL B. WALES, JR.
BY Elmer W. Edwards
AGENT

United States Patent Office

Re. 25,373
Reissued Apr. 23, 1963

25,373

SEQUENCE READOUT TRANSDUCER FOR ACCOUNTING MACHINES

Nathaniel B. Wales, Jr., New York, N.Y., assignor to Monroe Calculating Machine Company, Orange, N.J., a corporation of Delaware Original No. 2,983,440, dated May 9, 1961, Ser. No. 583,762, May 9, 1956. Application for reissue Mar. 26, 1962, Ser. No. 183,340
36 Claims. (Cl. 235—60.4)

Matter enclosed in heavy brackets [ ] appears in the original patent but forms no part of this reissue specification; matter printed in italics indicates the additions made by reissue.

The invention relates to means for controlling the operations of a tape or card punching device in accordance with digit values which are entered upon the totalizer wheels and printing devices of well-known accounting machines or the like. Amounts which are entered or taken from the register devices of the accounting machine are caused to be translated into coded electrical circuits for the purpose of controlling operations of a tape punching unit adapted to perforate coded combinations of holes into a continuous paper tape. Such perforated tape may then be fed into machines which relay information to punched tabulating cards, electric typewriters, teletype transmitters and the like.

An object of the invention is to provide an improved readout transducer for such machines which is adapted to control operations of the punching devices without building up additional loads upon the computing devices in effecting selective value adjustment of control contact wipers.

Another object is to materially increase efficiency and life expectancy of said contact wipers by the provision of mechanical storage devices which are adapted for displacing said wipers to value adjusted position without frictional contact engagements during such adjustment. Another object provides for an improved form of contact wiper.

A further object is the provision of improved switchboard devices adapted for displacing the value set ordinal contact wipers into simultaneous engagement with related selected value contact pins.

The invention includes improved switchboard devices embodying a stationary control panel having a plurality of orders of fixed contact members representative of digit values and a shiftable control frame having ordinal contact bars movable therewith into electrical engagement with related ordinal contact wipers and which bars thereafter cause displacement of the wipers into engagement with the selected digit value contact members.

Means are provided under control of the computer to lock set values into the storage devices while also effecting a displacement of the said switchboard control panel.

Sequence means which control successive operation of the punch means is controlled through displacement of the switchboard control frame so that sequential readout of the storage devices is effected in part with a portion of the cyclic operation of the computer, and includes means whereby values will be retained locked within the storage devices until released when the sequential operation of the punching devices has been completed.

Means are provided whereby selective circuit means in said sequence control operation will be effective in accordance with a columnar position of the shiftable record carriage.

Further, the invention includes means whereby operation of the tape perforating devices is effected in selective columnar positions only of the record carriage.

Other objects and advantages will be apparent from the following description and claims and illustrated in the accompanying drawings, which disclose, by way of example, the principle of the invention and the best mode which has been contemplated of applying that principle in one form of mechanism embodying the invention.

In the drawings:

FIG. 3 is a perspective view of the switchboard devices.

FIG. 4 is a fragmentary front elevation view of a portion of the switchboard devices, showing means for operating the switchboard frame.

FIG. 5 is a detail plan view of an improved contact wiper.

Figure 1:
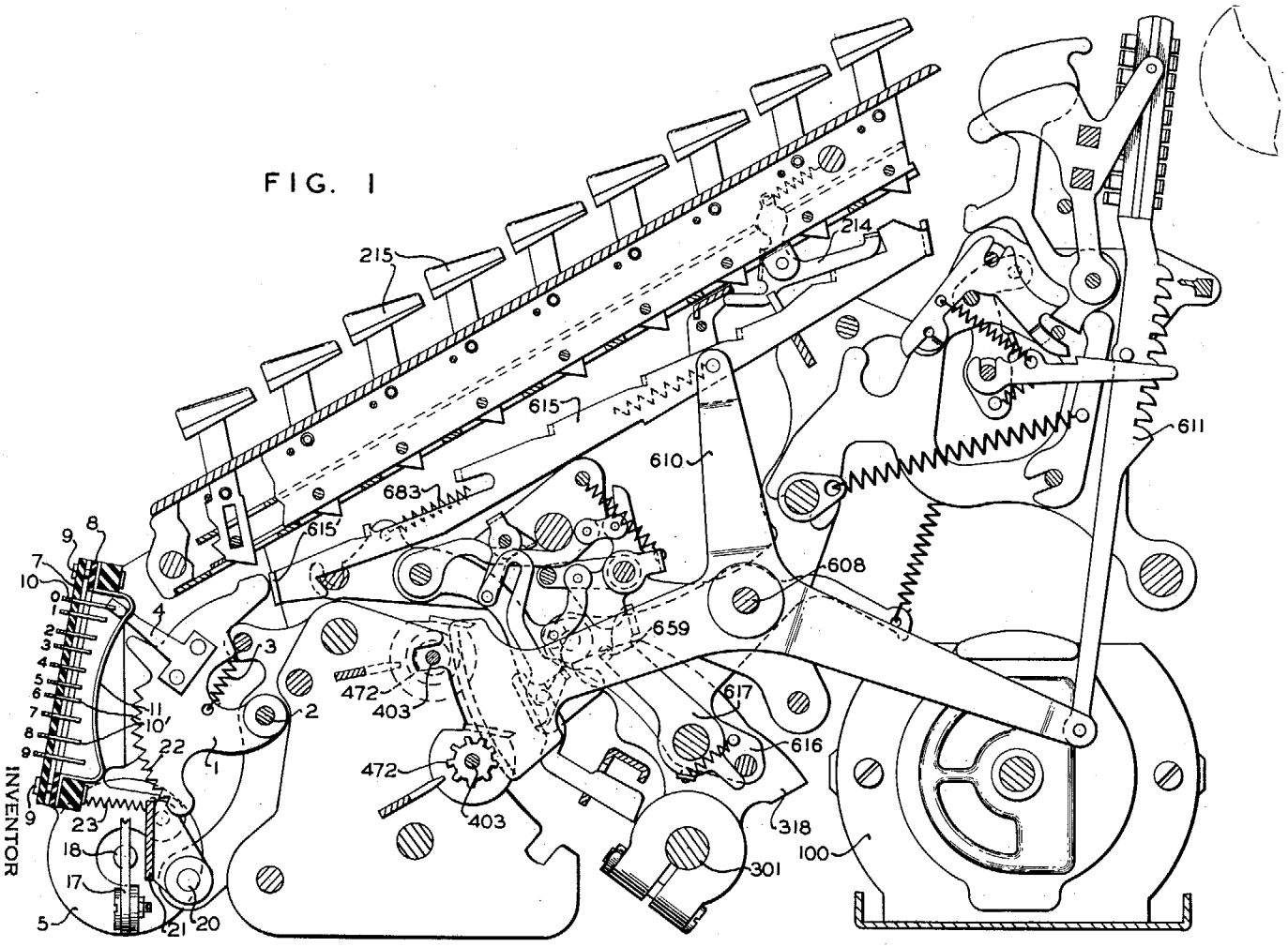
FIG. 1 is a cross section through the mid-section of an accounting machine.

The present invention contemplates the provision of an electromechanical readout device which is adapted to translate into selective electrical circuits data entered within certain mechanical storage devices employed in the well-known listing calculator and to control thereby operations of well-known tape perforating devices adapted for punching coded perforations in a continuous tape means.

The listing calculator to which the present invention is shown as applied is of well-known type, such as that set forth in the following U.S. patents to Loring P. Crosman:

1,932,013 dated October 24, 1933 for Register; 1,946,572 dated February 13, 1934 for Listing Calculator; 2,261,341 dated November 4, 1941 for Adding Listing Machine.

It will be sufficient to describe the machine proper very generally and to say that for each denominational order the machine is provided with a three-armed differential actuator lever numbered 610 (FIG. 1), loosely mounted on a shaft 608. The forward arm of each lever 610 terminates in a segmental registering rack; the rearward arm has a lister type bar 611 pivoted thereto and the upper arm has pivotal connection with a differentail stop bar 615 cooperating with a bank of digit keys 215 to limit the movement of the lever 610.

The digit keys 215 are depressible to represent a value and when depressed are latched in position with the bottoms of their stems lying in the path of movement of the related stop lugs of the bars 615, and allow such bars to advance a distance proportionate to the value of the depressed key, upon operation of the machine. Depression of a digit key will also remove a column latch 214 from the path of movement of its related bar 615, which latches prevent movement of a stop bar and lever 610 in any column in which no key is depressed.

A rock shaft 301 is provided with cam means 318 for governing the movement of a spring tensioned rocker frame 616, carrying a series of dogs 617 normally engaged by stud 659 of the lever 610. A shaft 301 is rotated forwardly (counterclockwise, FIG. 1) frame 616 will be rocked about shaft 608, and by any of the levers 610 which have been released by depression of digit keys 215 will be allowed to rotate, under the influence of their springs 683, until they are stopped by the lugs of bar 615, contacting with the stems of the keys. Upon rearward (return) rotation of shaft 301, the dogs 617 will return the operated levers 610 to normal position. This excursion of levers 610 serves to register amounts set in the keyboard upon one or more accumulators and to set up a similar amount on the printing line of the type bars.

Figure 2:
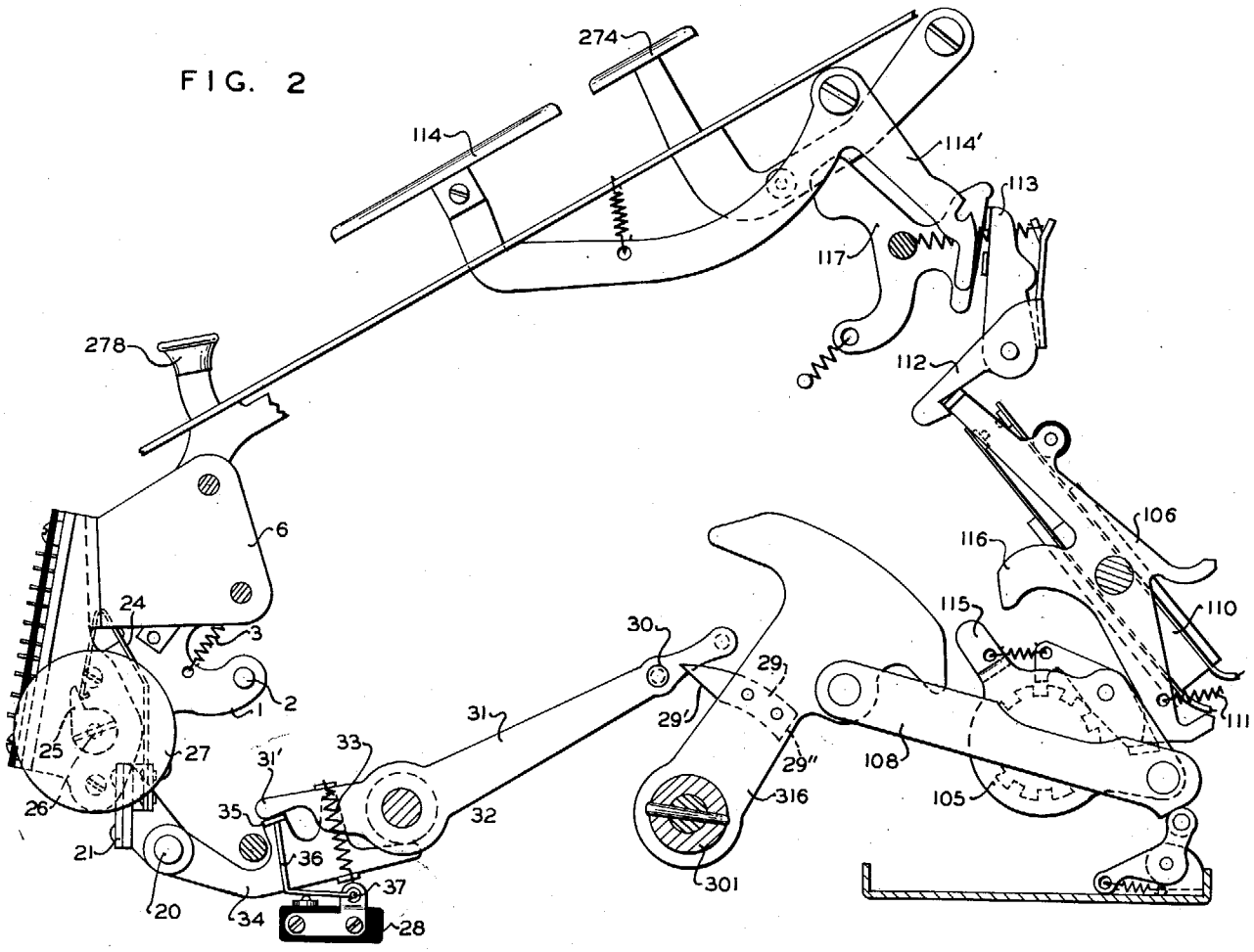
FIG. 2 is a right end elevation of the cyclic clutch means for the accounting machine and control means therefor.

Shaft 301 is oscillated by an electric motor 100, connected through suitable gearing and clutch means, with a crank arm 105 (FIG. 2) connected by a rod 108 to an arm 316, fast upon shaft 301, so that as crank arm 105 is rotated, shaft 301 will be oscillated.

Motor operation is controlled by motor bars or keys through a clutch lever 106 which is provided with a roller adapted to close contact members 110 in the motor circuit after lever 106 is moved out of restraining engagement with the spring operated clutch. A spring 111 tends to pull lever 106 away from the clutch, the lever being normally held in clutch engaging position by means of a latch 112. Latch 112 is controlled by a trigger 113, lying in the path of movement of a lever arm 114' connected with an add key or plus bar 114. Upon depression of key 114, trigger 113 is rocked clockwise to release latch 112 and clutch lever 106 will be pulled out of engagement with the clutch to start the machine in operation.

Upon release of key 114, latch 112 will return under spring action into latching position and, toward the end of the cycle of operation, an arm 115 connected with crank member 105 will contact a tooth 116 of the clutch lever 106 and will force said lever back into latching position, breaking the electric circuit and bringing the end of lever 106 into the path of movement of the rotating clutch member to terminate the cycle.

As more fully disclosed in the Crosman Patent 1,946,-572 to which reference is made for complete details, during operation by the plus bar 114, the accumulator shafts 403 (FIG. 1) will be moved away from the racks of levers 610 before said racks are allowed to move, and will be moved to reengage the gears 472 while the racks lie in the extreme positions permitted by the keys 215 and stop bars 615. As shaft 301 is returned and the racks are raised, the value set in the keyboard will be additively transferred to the register.

A subtract key or minus bar 274 is located adjacent the plus bar 114. The free end of the subtract key lever is adapted to contact with and rock a plate 117 in a clockwise direction; said plate in turn also operates the trigger 113 to release latch 112 and start the machine in operation.

Also, as set forth in said patent, operation of the minus bar 274 will adjust suitable devices for changing the time at which the accumulators are shifted out of and into mesh with the segmental racks so that the accumulators remain in engagement during the first or downward stroke of the racks and are thereafter disengaged before the return stroke of said racks, and consequently register subtractively those amounts set up in the keyboard.

A total is taken in the well-known manner fully disclosed in the U.S. Patent 2,261,341 of reference, in which operation of a total key 278 effects release of the differential stop bars 615 and allows their segment racks 610 to rotate the accumulators subtractively until suitable pins on the accumulator wheels contact with zero stop members. This will set the total (the amount subtracted from the accumulator wheels) in the type bars following which the totalizing device trips the cyclic clutch, whereupon the machine will be caused to cycle and the hammers will then be tripped to print the total. The racks 610 with bars 615 are then reengaged with the oscillating frame 616 and during the return stroke of the frame the bars move rearwardly to normal position, the accumulator wheels being disengaged from the racks 610 before the return stroke is made, whereby the accumulator which has been totalized will stand at 0.

THE TRANSDUCER

Values as entered upon or totalized from the accumulator wheels of the computer and represented by the forward extent of movement permitted the bars 615, and racks 610 are translated into perforations of a record tape through the reading out of said values from the computer in sequential manner from a higher to lower denominational order, but could as well be effected from lower to higher order if desired. So that such successive readout operations may be completed without interrupting a cyclic operation of the computer or otherwise delaying restoration of the stop bars 615 and racks 610, suitable storage or memory sectors 1 related to each of the bars 615 are provided, which are displaceable with said sectors in accordance with a forward movement of its corresponding stop bar 615 and thereafter locked in set position in the manner as hereinafter described.

Storage sectors 1 are loosely mounted upon a transverse shaft 2 of the computer and yieldably held by means of individual springs 3 in a clockwise raised position for engagement by the projection 615' formed on the forward end of the stop bars 615. Mounted upon each of the sectors 1 and electrically insulated therefrom is a contact wiper 4 and during a forward movement of bars 615 sectors 1 are caused to be rotated counterclockwise about shaft 2 to a position corresponding to the value represented by a displacement of the bars 615. This will position said wipers adjacent to corresponding value contact pins 10' of the related order, pins 10' being secured within a stationary frame 7 of switchboard devices to be subsequently described.

During the above adjustment of contact wipers 4 it is desirable that additional mechanical load of the memory sectors 1 be avoided and for this reason wipers 4 are adjusted to value set position 5 by sectors 1 free of any frictional contact engagements and are thereafter all moved simultaneously into lateral engagement with contact pins 10', in the manner as hereinafter will be described.

Switchboard frame 7 is secured by means of brackets 5—6 to the left and right end plates respectively of the machine and is formed of a molded dielectric material in which are mounted ten electrical conducting comb bars 10 in superposed levels, said bars corresponding to the digit values 1–9 and 0, as illustrated in FIG. 1. Each of the bars 10 has a plurality of rearwardly projecting contact elements 10', there being a contact 10' for each denominational order of wipers 4 provided in the machine. Contact elements 10' extend rearwardly within the arc transcribed by the value settings of the related contact wipers 4 but are positioned slightly to the right of wipers 4 so that said wipers are adjusted to a value setting position, as earlier described, without engagement with contacts 10'.

Slidably supported between upper and lower guide studs 9 secured within the fixed frame 7 of the switchboard is a shiftable frame 8. Related to each contact wiper 4 there is mounted at 12—12' upon the shiftable frame 8 a contact control bar 11 which is formed as an arc within the radius of wipers 4 about pivot shaft 2. Frame 8 is biased toward the left by spring means 13, so that bars 11 are held leftward out of frictional engagement of contact wipers 4 while said wipers are being adjusted to value set position. Following adjustment of wipers 4, however, frame 8 will be shifted toward the right, in the manner and for the purpose as will now be described.

Secured to the bracket 5 on the left-hand side framing of the machine is a magnetically operated solenoid 14 of well-known type having both rotary motion and axial motion. Mounted within solenoid 14 is a plunger 15 to the left end of which is fast the armature 16 of solenoid 14, while the opposite end of said plungers has engagement with an upwardly extending lever 17, pivotally mounted at 18 upon an ear 5' of the bracket 5. The upper end of lever 17 has engagement with a stud 19 fast within the shiftable frame 8 of the switchboard devices and upon energization of solenoid 14, in the manner as hereinafter described, armature 16 and plunger 15 will be moved toward the right (FIG. 4) and impart a clockwise movement to lever 17. Clockwise movement of lever 17 through stud 19 will act to displace panel 8 of the switchboard devices toward the right and all of the ordinal contact bars 11 are carried thereby into engagement with their related denominational order contact wipers 4. The above-described operation of bars 11 act not only to extend electrical circuits from said bars 11 to the related wipers 4 but will act also to effect a lateral displacement of the wipers 4, whereby said wipers are brought into engagement with the selected contacts 10' of comb bars 10 in accordance with the value displacement of said wipers by stop bar 615, earlier described.

As illustrated in FIG. 5 of the drawings, the free end of contact wipers 4 are made in substantially U-shaped form whereby the contact surface 4' of said wipers will be in an offset position from the pivot arm of the wipers. Thus upon a rightward angular displacement of wipers 4 by bars 11 contact surface 4' moves in an arc for engaging contacts 10' in a wiping movement and upon said engagement a collasping action of the U-shaped end of said wipers serves to augment said wiping action thereby maintaining clean and efficient contact areas.

It is recalled that values stored within memory sectors 1 are to be read out of said sectors in a sequential manner and that it is desirable to have the actuator stop bars 615 free to return to their normal retracted positions to avoid the necessity of interrupting or holding up operation of the cyclic devices of the computer in order to permit sufficient time for the sequential readout to be completed. The following means are provided, therefore, whereby memory sectors 1 will be locked in a value set position and released thereafter under control of the cyclic devices of the computer during non tape perforating operations thereof but will continue in a locked condition in tape perforating control operations until released by completion of an operation of the readout devices, which operation occurs coincident with a return movement of stop bars 615 and may not be completed until after the completion of a cyclic operation of the computer.

Loosely mounted upon the right and left end portions of a cross shaft 20 of the machine is a locking bail 21 extending transversely of memory sectors 1 and normally held through spring means 23 out of engagement with suitable serrations 22 formed on the forward edge of memory sectors 1. Fast to bail 21, near the right-hand end thereof, is an upwardly extending spring tempered arm 24 having the upper end portion bent downwardly in a position rearward of an operating arm 25. Arm 25 is secured to a shaft 26 forming the plunger of a well-known form of rotary type solenoid 27, such as that disclosed in U.S. Patent 2,496,880 issued February 7, 1950 to George H. Leland, and to which reference is made for details of structure and operation not herein set forth, it being sufficient to say that upon energization of solenoid 27 shaft 26 is caused to be rotated in a clockwise direction, as viewed in FIG. 2. During a clockwise operation of shaft 26 arm 25 engages spring arm 24 and will rock locking bail 21 clockwise into engagement with serrated edges 22 of memory sectors 1 locking said sectors in value adjusted position against tension of their respective springs 3 until said bail 21 is caused to be released by a deenergizing of solenoid 27, as hereinafter described.

Placed in the circuit means for solenoid 27 and in parallel circuit with the solenoid 14, for displacing frame 8 of the switchboard devices earlier described, is a snap switch 28 of known design, which is adapted for operation by the cyclic devices to cause energizing of solenoids 14 and 27, as follows.

Secured to arm 316 of operating shaft 301 is a double faced cam block 29 the cam surface 29' of which is adapted in a forward movement of arm 316 to engage with roller 30 on the rearward arm of a lever 31, fulcrumed upon transverse shaft 32, and impart a clockwise movement to said lever. Lever 31 has yieldable spring connection 33 with a rearwardly extending lever

34, loosely mounted upon the shaft 20. In the above-described clockwise movement of lever 31 cam block 29 thereafter moves above roller 30 and near the end of the forward stroke of arm 316 said cam is carried beyond roller 30, whereupon spring 33 restores lever 31 counterclockwise and roller 30 is thereby positioned in the path of a cam surface 29'' for the return movement of cam block 29. A forward arm 31' of lever 31 has engagement with a lug 35 of the lever 34 and during the first portion of a return movement of cam block 29 cam surface 29'' engages roller 30 to impart a counterclockwise movement to the lever 31, whereupon arm 31' engaging lug 35 imparts a clockwise movement to the lever 34. Lug 35 of lever 34 overlies an arm 36 pivoted at 37 to the snap switch 28 and upon clockwise movement of lever 34 lug 35 rocks arm 37 downwardly closing switch 28 to thereby effect operation of the solenoid 27 for engaging locking bail 21 with memory sectors 1. At the same time closure of switch 28 will also effect an energizing of solenoid 14 to displace frame 8, thus engaging wipers 4 with selected contacts 10', whereby digit values represented upon sectors 1 and wipers 4 are caused to be translated into electrical circuits for operating suitable tape punch means, as in the manner to be described.

It will be noted that cam surface 29'' engages roller 30 early in a return stroke of the machine cycle to effect engagement of locking bail 21 with memory sectors 1 before cam 318 (FIG. 1) of the cyclic devices starts return movement of the actuator stop bars 615. Also that during a return operation cam block 29 will pass beneath roller 30 and hold lever 31 in raised position, until near the end of an operation of the cyclic devices when cam block 29 is carried free of roller 30. Thus solenoids 27 and 14 will remain energized to maintain locking engagement of bail 21 with memory sectors 1 and circuit engagement of wipers 4 with contacts 10' throughout a return operation of the cyclic devices. Upon release of roller 30 from cam block 29 spring 33 will act to restore levers 31 and 34 and thereby normally disengage circuit switch 28, thus deenergizing solenoids 27 and 14 and allowing the parts to return to normal. As previously stated, however, in a tape perforating control operation values are to be read out of memory sectors 1 in a sequential manner to effect successive corresponding operations to the tape perforating devices. It may occur therefore that switch 28 would be disengaged by the cyclic devices of the computer prior to the completion of a tape perforating sequence readout operation and for this reason suitable holding circuits for solenoids 14 and 27 are provided, whereby said solenoids will remain energized until a readout has been completed, as will be described.

The more readily to understand the invention and a preferred mode of operation to which the same is to be put, a typical example of a "Passbook Posting to Journal" routine will be described in connection therewith, particular reference being made to the diagrammatic illustration of parts and circuit means shown in FIGS. 6—6a.

(1) (3) (7)

PASSBOOK POSTING JOURNAL

| Account Number | Old Balance | Deposit or Withdrawal | Date | | Date | Passbook Balance |
|---|---|---|---|---|---|---|
| 123 | 500.00 | 75.00 | Feb. 5, 1955 | | Feb. 5, 1955 | 575.00 |

A journal sheet having been inserted within the shiftable platen carriage 40 of the lister-calculator, in usual manner, the carriage is placed to the extreme right-hand position, so that column (1) of the record sheet will be opposite type members 611.

In the illustrated example it is desired to have account numbers as listed upon the journal sheet entered also as coded perforations in the record tape 41. For this purpose a control pin 42 is secured to the platen carriage and is adapted with the carriage in the column (1) position to effect engagement of the contact mem-members 43 of a snap switch 44, suitably positioned and secured upon the base structure of the machine. Operation of switch 44 will establish circuit from a terminal ground lead 45 through closed contacts 43 to the negative pole of a relay 46. The opposite pole of relay 46 being connected to plus circuit terminal lead 7, [whch] *which* includes normally closed contacts 48 of a switch member 49 to be described, said relay is energized to attract its armature 46′ and thereby effect operation of a group of circuit control switches 50, 51, 52 and 53 associated with said relay. With the carriage in column (1) position, therefore, the described operation of relay 46 will effect a closure of switch 50 to extend ground circuit 45 to the normally open snap switch 28, which switch is adapted to be subsequently closed by the cam member 29 through means of the cyclic devices of the computer in the manner earlier described with reference to FIG. 2. The account number (123) is now set up on digit keys 215 and a non-add printing cycle of operation of the listing-calculator is initiated, by means of the operating bar 114 in the usual manner, the register being controlled for non-add operation by the well-known program devices set forth in reference to Patent 1,946,572.

During a resultant forward operation of the cyclic devices the stop bars 615 (FIG. 1), in displacing type members 611 to effective position for printing of the account number (123), will effect also a corresponding value displacement of the related memory sectors 1. Thus contact wipers 4 related to the units, tens and hundreds orders will be positioned opposite related order contacts 10′ in the fourth, third and second levels (reading from top to bottom) respectively of the comb bars 10, while all wipers 4 to the left will remain in position opposite their related zero contact members 10′ of the first level comb bar 10.

As earlier described, after stop bars 615 have completed their forward movement a printing operation will be effected and the bars 615 are then subsequently returned to their normal position. However, it will be recalled that prior to a start of the return movement of bars 615 cam 29 (FIG. 2) will act to effect contact engagement of snap switch 28. Thus ground circuit 45 will now be extended, through the closed contacts of switch 50 earlier described, and through the closed switch 28 to the negative pole of a relay member 55, the opposite pole of which relay extends to the plus terminal lead 47 through the normally closed contacts 48 of switch 49. Upon the described closure of switch 28 therefore, relay 55 becomes energized and will attract armature 55′ to effect closing of a group of contact switches 56, 57, 58 and 59, associated with said relay.

Upon closure of the contact switch 53 of said group, terminal ground circuit 45, passing through previously closed switch 50, is now extended through the switch 57 to the negative pole of the solenoids 14 and 27 earlier described and the opposite poles of solenoids 14 and 27 being connected directly to plus lead 47 both of said solenoids are caused to be energized at this time. Energizing of solenoid 27 will effect an operation of the bail 21 (FIG. 2) into engagement with memory sectors 1 to lock said sectors in value set position. At the same time solenoid 14 (FIGS. 3–4) effects a rightward movement to the switchboard frame 8 so that contact bars 11 of frame 8 will engage the related denominational order wipers 4 and rock said wipers into engagement with the related order value contacts 10′ of the selected value comb bar 10, as in the manner earlier described.

Comb bars 10 represent digit values 0 and 1 to 9 of the decimal system and have suitable connections to coded punch selection magnets 60 (FIG. 6a) of a well-known tape perforating unit 61 through means of a decimal to code translating plug board 62, of known design associated with such tape perforating means. A typical example of the manner in which this plug board 62 is wired is shown in connection with the decimal "5" input lead. A signal on this lead is arranged to energize the punch magnets corresponding to the 1, 4, and "feed hole" channels of the punch 61 by means of diodes 120, 121 and 122 respectively. It will be sufficient to say that upon release of a suitable clutch member 63, a cyclic operation of the punch unit effects coded perforations in the usual tape means 41 in accordance with the selective combination of coded operations of the control magnets 60.

Alternative to the motor driven clutch type of punch shown, it is evident that a punch having a direct magnet punch drive in conjunction with a magnet driven transport device and a self-cycling switch means would be equally suitably and operative with the subject invention.

Contact bars 11 (FIGS. 3 and 6) of switch panel 8, with the exception of the extreme left-hand bar 11a and the right-hand bar 11b, are connected by electrical circuit wiring directly to related contact members 65 of a sequence circuit switch member 66. The extreme left contact bar 11a, however, is reserved for special purpose to be described and has connection to contact 65a of switch 66 through contact switch 51, previously closed by relay 46 controlled by the record carriage in the first columnar printing position.

The contact bar designated 11b and located at the right of bars 11 relates to a contact wiper 4 associated with a storage sector 1 which is utilized for symbol character designations, said sector being adjusted by its related stop bar 615 in accordance with selection of the row of symbol keys 215′, as in the manner described for digit value keys 215. A circuit line connection extending between contact bar 11b and a related contact pin 65b of the sequence switch 66 is, however, broken by virtue of the normally open contacts of a switch member 67 in said circuit, switch 67 being one of a group of switches 67, 68, 69, 70 (similar to the group 50–53) which are operable under control of the record carriage 40 in a tabulating movement of said carriage to a subsequent print-in columnar position, hereinafter to be described.

Figure 6:
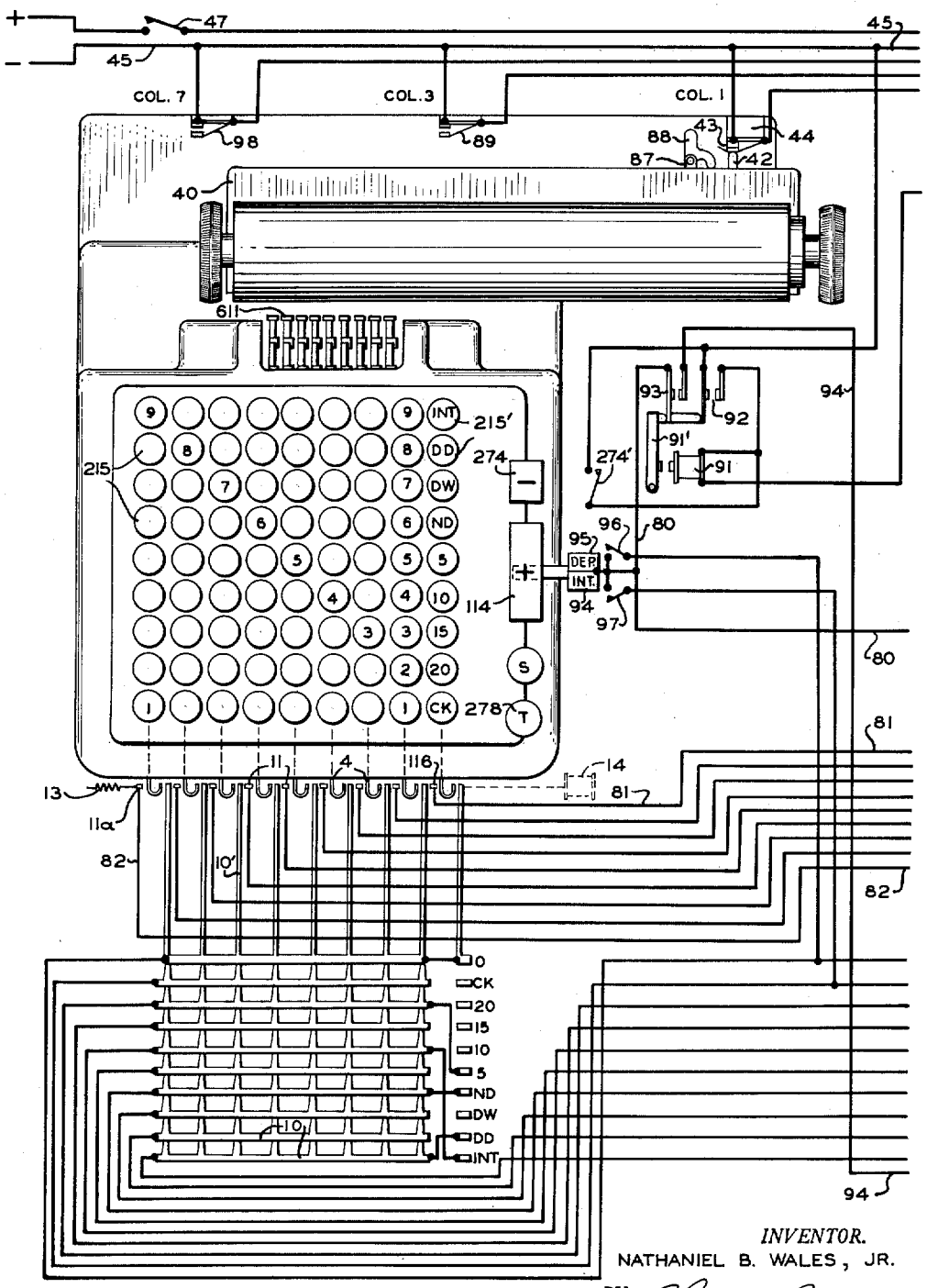
FIGS. 6 and 6a show a schematic diagram involving the circuits of the invention described herein.
Figure 6A:
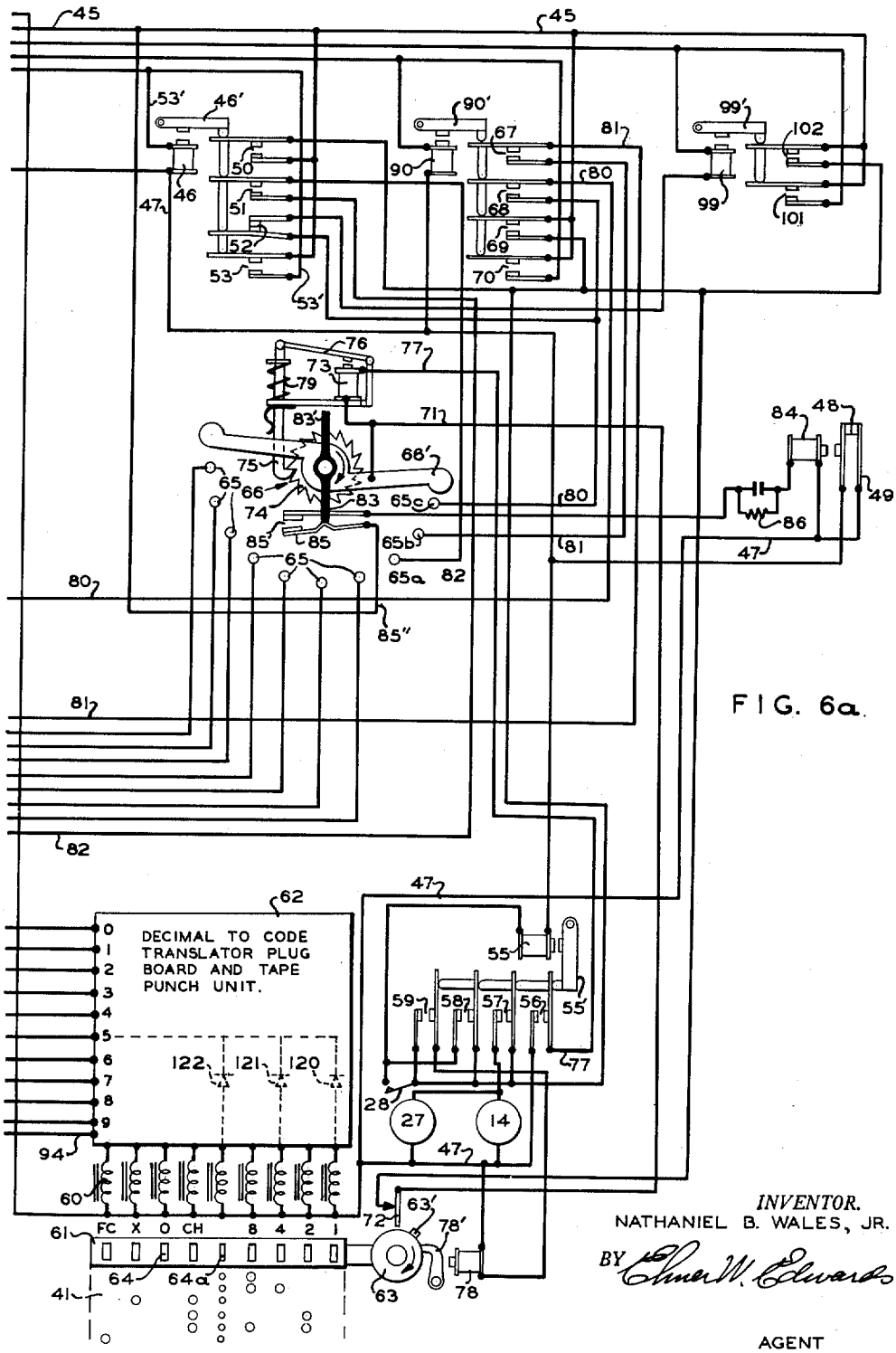

A rotatable contact wiper 66′ of sequence switch 66, when in the normal position illustrated in FIG. 6a, is free of engagement with any of the contact pins 65–65c and is adapted in a clockwise indexing operation to engage said pins in the manner and purpose to be described. Wiper 66′ is in continuous engagement with circuit lead 71, which extends to terminal ground line 45 through a normally closed contact switch 72 to be later described and by means of the switch 50, now closed in the movement of record carriage 40 to the column (1) printing position.

Wiper 66′ of sequence switch 66 is fast with a ratchet wheel 74 operable in step by step manner through means of a pawl 75 secured to the armature 76 of a relay magnet 73 adapted for effecting operations of said switch as follows.

The negative side of magnet 73 extends to terminal ground lead 45 through lead 71, normally closed switch 72 and the now closed switch 50. Positive side of magnet 73 is extended by means of circuit lead 77 and the switch 56, previously closed by relay 55 earlier described, to the terminal plus lead 47. Therefore, upon closure of switch 50 by the record carriage and thereafter operation of switch 28 by a cyclic operation of the computer, with subsequent operation of switch 56, magnet 73 is energized and armature 76 will adjust pawl 75 one tooth preparatory to advancing ratchet wheel 74.

As earlier stated a perforating operation of the tape punch unit is effected through the release of a cyclic clutch member 63 and said clutch will be released by means of an electromagnet 78 controlled as follows.

One side of magnet 78 has connection directly to the terminal plus lead 47 while the opposite side of said magnet is connected to the switch member 59, which member it will be recalled is closed by armature 55' of relay 55 when snap switch 28 is operated following the forward movement of the computer devices. Closure of switch 50 and thereafter the closing of switch 59 through control of snap switch 28 acts to complete a circuit to magnet 78 and said magnet attracting armature 78' will release clutch 63 and start a cyclic operation of the tape perforating unit. It will be observed that such starting operation coincides with the start of a return movement of the computer devices so that the tape perforating means will be operated in unison with the computer during said return movement. At the completion of a computer cycle of operation switch 28 will be restored as earlier described. However, special means to be described are provided for maintaining continuous operations of clutch 63 and for thereafter terminating operations of the perforating devices after a readout operation is completed.

In each cycle of operation of punch clutch 63 a suitable pin 63' operable therewith acts to effect an opening and closing of contact switch 72 for momentarily interrupting ground circuit to magnet 73 and the wiper 66'. At the end of each cycle of operation of the tape perforating unit therefore magnet 73 is caused to be deenergized and permits pawl 75 under influence of spring means 79 to advance ratchet wheel 74 and wiper 66' one step of clockwise movement, while reengagement of contact switch 72 with consequent reenergizing of magnet 73 serves to again condition pawl 75 for a further indexing operation.

It will be apparent therefore that sequence switch 66 is operated in timed sequence with tape perforating operations and will act to extend ground circuit from lead 71 to the pins 65c, 65b, 65a and thereafter the several pins 65 in successive order.

During each operation of the punch unit a punch member, indicated at 64a, is caused to be operated and effect feed perforations within tape 41, whereby said tape engages suitable sprocket means which advance the tape in the usual and well-known manner.

The first pin 65c extends ground circuit by means of line 80 to the switch member 68 and said switch being related only to entries as made with the carriage 40 in column (3) position is open at this time and no control circuit is effected upon engagement of wiper 66' with pin 65c. Control from contact pin 65b is also related to operations with the carriage in the column (3) position and circuit from said pin is ineffective at this time through means of the normally open contacts of the switch member 67 in circuit line 81. Contact pin 65a however, relates to an operation with carriage 40 in the column (1) position and upon engagement of wiper 66' with said pin circuit will now be extended through lead line 82, contact switch 51 closed earlier by relay 46, and thence by suitable lead line to the contact bar 11a of the switchboard devices.

As described, all of the contact bars 11 together with bars 11a have been simultaneously displaced toward the right for the purpose of engaging wipers 4 with selected contacts 10' of the comb bars 10 in accordance with a displacement of the related storage sectors 1, which in the present instance represents an account number (123).

It is frequently desired that an account number be directed to selective items, departments or branch offices, etc., and the left-hand column of keys 215 may be reserved for this purpose, whereby circuit from pin 65a to bar 11a is selectively extended to the punch unit in accordance with a displacement of the left-hand sector 1 to effect selection of punch members 64 for effecting coded perforations indicative of such selective entry.

It is apparent therefore from the above description and circuit diagram that during continued cycles of operation of the punch clutch means 63 sequence switch wiper 66' will be indexed each cycle of operation to extend ground circuit successively to bars 11 from higher to lower denominational order, and memory sectors 1, which in the example illustrated stand at 0000123, will act to extend said circuit through the selected levels of comb bars 10 and thence by suitable circuit lines to the decimal to code translator plug board wherein punch selection magnets 60 are energized to control successive coded perforations of the tape 41 in accordance therewith.

Under high operating speeds or increased capacity, it is possible that the cam means 29 of the listing calculator may act to restore switch means 28 to open condition before a scanning cycle of sequence switch 66 is completed. Special means therefore are provided whereby circuits established by switch 28 will be maintained in effective condition until released under control of sequence switch 66. This is accomplished by means of the switch member 58, closed upon operation of relay 55 in the engagement of switch 28, earlier described. Said switch is adapted to extend a locking ground circuit to relay 55 from terminal ground lead 45, closed switch 50, suitable lead line and switch 58 and thence to the said relay 55, so that relay magnet 55 remains energized to maintain all circuits initiated through means of switch 28 in effective condition, until said magnet is released in the manner later described.

As fully described in the patents of reference, near the end of a return cycle of operation of the listing calculator well-known carriage tabulating devices will act to effect a tabulation of the carriage 40 and said tabulating operation might displace the pin 42 and thereby release the contacts 43 of the switch 44 related to the column (1) carriage position prior to a completion of the sequential readout operation relative to column (1). Suitable holding circuit means to magnet 46 is therefore provided, extending from ground lead 45, now closed switch 53, and thence by suitable lead line 53' to the magnet 46.

It will be recalled that plus circuit from terminal lead 47 extends to both magnet 46 and magnet 55 through the normally closed contacts 48 of the switch member 49. Switch 49 is adapted for momentary operation at the end of a scanning operation of sequence switch 66 in the manner and purpose as will now be described.

A scanning cycle of sequence switch 66 is completed at the end of each 180° of revolution of the contact wiper arms 66' and contact operating means 83, 83' rotatable with said switch are provided to effect control of circuit means to a relay magnet 84 to cause operations of switch 49 as follows.

In the normal open circuit position of arm 66' of sequence switch 66 one of the arms 83, 83' is in engagement with a switch member 85 and will hold contacts 85' of said switch in open condition. One arm of switch 85 has circuit line connection 85'' directly to terminal ground lead 45 while the other contact arm thereof has circuit line connection to relay magnet 84 through adaptation of well-known pulse type circuit condenser means numbered 86 on the drawings. Relay magnet 84 is connected from plus side directly to plus terminal lead 47 and following an initial operation of sequence switch 66 arm 83 releases contact 85' to close the circuit and charge pulse means 86. At the conclusion of a scanning cycle of operation of switch 66 the opposite of the arms 83—83' then engages switch 85 to reopen contacts 85' and thus discharge the pulse means 86 which thereby acts to effect a momentary opening and closing of the plus circuit switch 49. Said momentary operation of switch member 49 is adapted to open plus circuit from terminal lead 47 to the relay members 46 and 55 for sufficient time for said members to release their respective armatures 46' and 55', whereby switches 50 to 53 and 56 to 59 earlier described will be restored to normal setting and all circuits are again at normal condition, concluding the operation as related to the first columnar position of the record carriage 40.

In the particular example illustrated it will be assumed that no corresponding operation of the perforating devices is desired relative to an operation of the accounting machine with the record carriage in the second columnar position. No switch means for controlling relay member 46 by the carriage therefore is in this position and an operation of the accounting machine in this instance will be limited to merely effecting a registration and printing of the "Old Balance" amount 500.00, this being accomplished in the usual and well-known manner for such operations, following which the record carriage automatically tabulates to the column (3) position.

Pivotally mounted at 87 upon the record carriage 40 is a one way pawl 88 adapted as said carirage is tabulated to the third columnar position to effect momentary operation of a contact switch member 89, fast to the base structure of the machine. Momentary operation of switch 89 will extend terminal ground circuit 45 to the ground side of a relay member 90 and said relay being also connected to plus terminal lead 47 through the end of operation switch 49 as described for relay 46 is now energized to attract the armature 90' and thereby cause engagement of the contact points of the related switch group 67–70. Switch 69 of said group, like switch 50 described for column (1), is for the purpose of extending ground circuit to sequence switch relay 73 and to the wiper arm 66' of sequence switch 66, through normally closed punch cycle switch 72. Switch 69 also extends ground circuit to snap switch 28 operated through the cyclic devices of the accounting machine and the above-described circuits will therefore control operations as in the same manner fully described in connection with operations related to switch 50.

The switch 70 of the column (3) group corresponds to the switch 53 of the column (1) group and is for the purpose of locking ground circuit from terminal lead 45 to the relay magnet 90.

Entries which are made relative to the third column of the journal sheet may be either withdrawal entires requiring a subtractive operation of the calculator or in the nature of a deposit entry which calls for a plus character of operation. It may also be desired that such deposit entry be further characterized as to being in the form of a normal deposit entry or selectively in the form of an interest payment entry and said information is to be indicated by coded perforation on the tape means 41. Switch 68 of the above group related to column (3) therefore is provided for the purpose of extending ground circuit to activate the contact pin 65c, whereby in an operation of seqeunce switch 66 wiper 66' upon engagement with pin 65c will act to extend said ground circuit to certain switch means associated with selective operation control keys of the accounting machine in the following manner.

If the entry is a withdrawal item an operation of the accounting machine is effected in regular manner by means of subtract key 274. Operation of subtract key 274 however, is also adapted to effect closure of a switch member 274' associated with said key and will thereby extend ground circuit from terminal lead 45 to a relay magnet 91. Positive side of relay 91 has connection extended through the normally closed contacts 48 of the end *of* operation switch 49 earlier described to terminal plus lead 47, so that upon operation of switch 274' with subtract key 274 magnet 91 is energized and will attract its armature 91'. Operation of armature 91' effects contact closure of a pair of switch members 92 and 93, in which switch 92 serves to lock ground circuit to magnet 91 whereby said magnet will remain energized following a release of the subtract key 274 and switch member 274'. Switch 93 has one arm connected by means of circuit lead line 80 and closed switch 68 to the aforementioned contact pin 65c of sequence timer 66. The other arm of switch 93 has circuit lead 94 to the code translator plug board 62 of known design, wherein circuits are interconnected for selecting related punch magnets 60 for controlling coded perforations in selected channels of the tape means 41.

During the above subtract operation snap switch 28 is caused to be operated and effect closure of the relay 55 group switches 56—59 with consequent operation of the tape perforating and also sequence switch means 66 as in the manner previously described. It will be apparent therefore and from the previous descriptions that said switch at this time will not only successively read out such amounts as stored upon sectors 1 from the keyboard setting but will also upon engagement of arm 66' with the contact pin 65c now extend ground circuit from terminal lead 45, now closed switch 69, contact 65c, circuit lead line 80 including the now closed contacts of switch 68, and the switch means 93 closed in response to the operation of subtract switch 274' to code translator 62, and that therefore during operation of the perforating clutch 63 relative to contact 65c a perforation is now made in tape 41 indicative of a subtractive control operation.

In the event that an amount to be entered in column (3) is a deposit item however said entry will be made as follows.

Fulcrumed to the right-hand framing of the machine, for both a rearward and forward operation, is an operating lever 95, illustrated diagrammatically in FIG. 6. Lever 95 is adapted in both the forward and rearward operations thereof to depress the operating bar 114 and thus effect an operation of the lister-calculator machine. Associated with lever 95 are switch means 96 and 97 which are adapted to be closed selectively in accordance with a forward or rearward operation of lever 95, so that circuit from contact pin 65c, the switch means 68 and lead line 80 may thus be selectively directed to the code translator plug board 62, as illustrated in FIG. 6, and effect a coded tape perforation in accordance therewith during the subsequent operation of clutch means 63.

Following a machine function designation perforation of the tape 41 in the above operation of punch clutch 63 the pin 63' effects momentary opening and closing of switch 72 and advances sequence switch arm 66' to the contact pin 65b. In the column (3) position the switch 67 having been earlier closed, a circuit is now extended from contact 65b through closed switch 67 and lead 81 to the particular bar 11b which is related to the contact wiper 4 adjusted by the memory sector 1 controlled by the bank of symbol keys 215'. Thus a symbol designation selectively set up on keys 215' and subsequently stored within a related sector 1 during operation of the listing calculator will at this time, in the manner fully described in connection with a digit value operation, be caused to be perforated within the tape 41.

Following the above-described symbol perforating operation of tape 41 the sequence switch arm 66' is indexed to engage the contact pin 65a and the circuit control from said pin being related only to operations with the record carriage 40 in the column (1) position is ineffective at this time through means of the open contacts of the switch member 51. At this time therefore during operation of clutch 63 a tape advancing and feed perforating operation only will be effected in the usual well-known manner. Thereafter during continued operation of punch clutch 63, with consequent momentary operations of switch 72, sequence switch arm 66' will successively engage pins 65 to scan the set digit values (00075.00) stored upon memory sectors 1 in the operation of the accounting machine for the third columnar position of the record carriage and control thereby the coded perforations of tape 41, as in the manner fully disclosed in connection with operations described relative to the first columnar position.

At the completion of the scaning operation of sequence switch 66 the arm 83 thereof will now reopen contact members 85 and thereby, through the pulse circuit means 86 earlier described, effect a momentary opening of contacts 48 of the end of cycle switch 49, whereby all relay magnets and switches controlled thereby will be restored and the circuits normalized.

It will be assumed that in the posting operations for the columns 4, 5 and 6 of the journal sheet that entries are to be made without effecting a control of the tape perforating devices. Such operations therefore will be effected in usual well-known manner and are not necessary to be described herein, except to say that as the record carriage is tabulated into the number (7) columnar position following said operations a switch member 98 will be momentarily operated by means of the one way pawl 88 earlier described in connection with the column (3) position switch 89.

Operation of switch 98 will extend terminal ground lead 45 to a relay member 99 related to the number (7) position of the carriage 40 and it will be observed that the positive side of relay magnet 99 extends through the normally closed contact points of the switch member 52 associated with relay 46 of the number (1) position of the carriage and thence through the normally closed contacts 48 of the end of cycle switch 49 to plus terminal lead 47. Engagement of switch 98 therefore will energize relay 99 to attract armature 99' and thereby effect engagement of the contact points of a pair of switch members 101—102. Engagement of switch 101 is for the purpose of maintaining relay magnet 99 energized, through locking ground circuit thereto from terminal ground lead 45 as shown. Engagement of switch member 102 is for the purpose of extending ground circuit to snap switch 28 and to sequence switch 66, together with devices associated therewith, in the same manner and for the same purpose as fully described in connection with operations controlled by the switch 50 associated with relay 46 related to the column (1) position of carriage 40.

The number (7) columnar position of the record carriage 40 is for the purpose in the example illustrated of posting a pass book balance upon the journal sheet and it is desired that such a balance be also recorded upon the tape means 41. Accordingly a total taking operation will be initiated in this columnar position, either by means of manual operation of the total key 278 or in automatic manner by well-known devices such as fully disclosed in the patents of reference. As earlier described during a totalizing operation the levers 610 are successively released to rotate the type bars 611 to printing position and during said operation stop bars 615 will transfer such amounts upon memory sectors 1. Thereafter an operation of the cyclic devices is effected to print the total upon the record sheet, during which cam member 29 (FIG. 2) now operates snap switch 28 and will thereby extend ground circuit from the closed switch 102 to the cycle lock relay 55. Thus relay 55 is now again energized to operate the switch members 56–59 and effect operation of solenoids 14 and 27 to lock memory sectors 1 in value set position and for displacing switchboard panel 8 while also releasing clutch 63 and effecting operation of sequence switch 66, all as in the manner heretofore described.

In the number (7) column position no circuits are effected from contact pins 65c, 65b and 65a and during operations of punch clutch 63 and switch arm 66' relative to said contacts the tape 41 is merely advanced idly a corresponding number of spaces through means of the usual tape feed perforations.

Upon the continued operation of punch clutch 63 with consequent operations of sequence switch 66, however, subsequent engagement of wiper arm 66' with each of contact pins 65 will act to read out successively the stored total value (00575.00) from memory sectors 1 so that corresponding coded value perforations are made in tape 41, as in the manner previously set forth.

As in the manner earlier described, upon final operation of sequence switch 66 contact control arm 83 of said switch will effect opening of the contact points 85' of switch 85 to effect operation of pulse means 86, which momentarily releases contacts 48 of the end of cycle relay switch 49 and thereby restores all circuits again to normal condition.

It is customary in machines of the character described herein to provide devices whereby following a final operation the record carriage is automatically returned to the initial starting columnar position (1), such means being fully disclosed in the aforementioned patents of reference. In the event a great number of denominational orders are provided it may be that the record carriage either by such means or upon manual return operation is returned to the starting columnar position (1) before the sequence switch 66 has completed a readout operation. It will be recalled that a movement of carriage 40 to column (1) position acts to engage switch member 44 and cause operation of the relay 46. Under the conditions set forth above relay 46 might be energized prior to a release of the relay 99 related to column (7), as released by the end of operation switch means 49. Because this is undesirable plus circuit from switch 49 to relay 99 is placed under control of the normally closed switch 52 associated with relay 46 of the carriage (1) position. Thus an operation of relay 46 as the carriage returns to the column (1) position effects opening of switch 52 and will restore relay 99, together with its associated switches 101—102 to their normal condition. Under this arrangement ground circuit from switch 102 is relinquished and is now controlled through means of the switch member 50 closed by relay 46, as in the manner previously described for column (1) position of the carriage 40. Circuit is thus maintained until the end of a readout operation of sequence switch 66, when operation of switch 85 by sequence switch arm 83 effects operation of pulse means 86 to momentarily open the end of operation switch 49 and bring all circuits into normal condition.

It will be noted that during the above return movement of record carriage 40 one way pawl 88 in engaging switch members 98 and 89 will yield and is therefore ineffective relative to operating said switches at this time.

While there has been shown and described the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In an accounting machine or the like having a plurality of item selecting members, registering devices, printing devices including a plurality of displaceable type members, a plurality of differentially movable reciprocatory actuators for the registering and printing devices, cyclic operating devices, a plurality of settable members adjusted to selective positions by the differential actuators in a forward movement thereof and means for holding said members in adjusted position during return movement of said actuators; in combination therewith an electric circuit control means for translating well-defined positions of the said settable members into selective electric circuits including a switchboard having a fixed frame provided with a plurality of groups of circuit contact members each group related to a corresponding order of said settable members, a shiftable frame having mounted thereon an elongated contact bar for each group of said contact members, a contact wiper displaceable with each of said settable members and electrically insulated therefrom, and wherein said contact wipers are spaced between the said contact bars and the related group of contact members for displacement by said settable members without frictional engagements with said bars and said contact members, and wherein subsequent displacement of the movable switchboard frame effects engagement of said bars with the related contact wipers and thereafter moves said wipers into circuit engagement with a selected related contact member in accordance with the displacement of said settable members.

2. The invention according to claim 1 and including magnetic means for effecting engagement of said holding means with said settable members and for concurrently effecting a displacement of said shiftable frame, circuit means for said magnetic means including a normally open switch, control means operable by the cyclic devices of the accounting machine for closing said switch to effect circuit operation of said magnetic means prior to a return movement of the actuators, means adapted for releasing said switch to normalize the magnetic means and restore said switchboard frame and said holding means following a return movement of the actuators, whereby the settable members are released to restore said contact wipers free of frictional engagement with said bars and said contact members.

3. The invention according to claim 2 and wherein the said contact wipers are fast upon the said settable members and are insulated electrically therefrom.

4. In an accounting machine or the like having a plurality of item selecting members, registering devices, printing devices including a plurality of displaceable type members, a plurality of differentially movable reciprocatory actuators for the registering and printing devices, operating means therefor having an initiating and a restoring stroke, a plurality of settable members adjusted to selective positions by the differential actuators in an initial movement thereof and means for holding said members in adjusted position during a restoring movement of said actuators; in combination therewith and electric circuit control means for translating well-defined positions of the said settable members into selective electrical circuits including a switchboard having a frame secured to the accounting machine in stationary manner and extending transversely relative to said settable members, a second frame mounted therewith and adapted for longitudinal movement relative to the said stationary frame, a plurality of elongated ordinal column contact bars fast on said movable frame and mutually insulated from one another, said bars being related each to a corresponding order of said settable members, a plurality of elongated circuit bars mounted in superposed levels upon said stationary frame and having a plurality of contact elements each related to a corresponding order of the said column contact bars, said bars being mutually insulated from one another, a contact member displaceable with each of said settable members and insulated from one another, and wherein said contact members are spaced between the said contact bars and the related group of said contact elements for displacement by said settable members without frictional engagements with said bars and said contact elements, and wherein subsequent displacement of the movable switchboard frame effects engagement of said bars with the related contact members and thereafter moves said contact members into circuit engagement with a selected related one of the said contact elements in accordance with the displacement of said settable members.

5. In an accounting machine or the like having a plurality of item selecting members, registering devices, printing devices including a plurality of displaceable type members, a plurality of differentially movable reciprocatory actuators for the registering and printing devices, operating means therefor having an initiating and a restoring stroke, a plurality of settable members adjusted to selective positions by the differential actuators in an initial movement thereof and means for holding said members in adjusted position during a restoring movement of said actuators; in combination therewith an electric circuit control means for translating well-defined positions of the said settable members into selective electrical circuits including a contact wiper displaceable with each of said settable members and insulated from one another, a switchboard having a fixed frame and a frame mounted for longitudinal linear displacement relative to said fixed frame, a plurality of elongated ordinal column contact bars secured upon one of said frames each bar being adapted for cooperation with a related contact wiper in any set positions of said wipers controlled by the settable members, a plurality of elongated circuit bars mounted in superposed levels within the other of said frames in accordance with cardinal values, and wherein each bar is provided with a plurality of ordinal column teeth integral therewith said teeth extending through and beyond the said frame for cooperation with the corresponding orders of said contact wipers, and wherein a displacement of the shiftable frame effects engagement of the contact wipers with the related orders of said ordinal column contact bars and with a selected contact tooth in the corresponding columns of said elongated circuit bars in accordance with the displacement of said contact wipers by said settable members.

6. The invention according to claim 5 and wherein said contact wipers are spaced between the said contact bars and the related group of contact members for displacement by said settable members without frictional engagement with said ordinal column contact bars and said ordinal column teeth and wherein the said displacement of the shiftable switchboard frame effects first engagement of said bars with the related contact wipers and thereafter moves said wipers into circuit engagement with the said selected ones of said contact teeth.

7. In an apparatus of the character described, in combination, an accounting machine including a plurality of item selecting members, registering devices, printing devices including a plurality of displaceable type members, a plurality of differentially movable reciprocatory actuators for the registering and printing devices, cyclic operating devices, a plurality of settable members rotatable to selective positions by the differential actuators in a forward movement thereof, locking means adapted under control of the cyclic operating devices for retaining said settable members in set condition during a return movement of said actuators and for releasing said members following said return movement; tape perforating means associated with said accounting machine including a plurality of punches and dies, punch operating magnets and a cyclic operating means for effecting a punching operation; a transducer between the said accounting machine and the tape perforating means adapted to convert well-defined positions of the settable members into electrical circuits for effecting selective operation of the said punch magnets including a switchboard having a fixed frame provided with a group of selective circuit contact members related to each order of said settable members, a shiftable frame having mounted thereon a contact bar for each group of said contact members, a circuit selecting contact wiper spaced between each contact bar and related group of contact members and being displaceable in accordance with an operation of said settable members independently of frictional engagement with said bars and said contact members, and wherein a subsequent operation of the switchboard frame will effect engagement of said bars with said contact wipers and move said wipers into frictional engagement with said contact members.

8. In an apparatus of the character described, in combination, an accounting machine including a plurality of item selecting members, registering devices, printing devices including a plurality of displaceable type members, a plurality of differentially movable reciprocatory actuators for the registering and printing devices, cyclic operating devices, a plurality of settable members rotatable to selective positions by the differential actuators in a forward movement thereof, locking means adapted under control of the cyclic operating devices for retaining said settable members in set condition during a return movement of said actuators and for releasing said members following said return movement; tape perforating means associated with said accounting machine including a plurality of punches and dies, punch operating magnets and a cyclic operating means for effecting a punching operation; a transducer between the said accounting machine and the tape perforating means adapted to convert well-defined positions of the settable members into electrical circuits for effecting selective operation of the said punch magnets including a circuit selecting contact wiper displaceable in accordance with an operation of the related one of said settable members independently of frictional engagements, a switchboard having a frame secured to the accounting machine in fixed relation to the said contact wipers and having mounted thereon a series of elongated longitudinal circuit bars spaced one over the other in linear horizontal superposed levels, and wherein each circuit bar has integral therewith a series of laterally spaced elongated contact teeth normally spaced free of engagement with the corresponding orders of said contact wipers, a second switchboard frame mounted with said first frame and adapted for a longitudinal movement relative thereto, a series of elongated laterally spaced vertical contact bars normally out of engagement with related of said contact wipers, and wherein the said longitudinal movement of said second frame acts to displace said vertical bars into engagement with said contact wipers and to move said contact wipers into engagement with the said contact teeth of the said fixed frame.

9. The combination as set forth in claim 8 and including coding circuits between the said selective contact members and the said punch magnets and wherein following the said displacement of the switchboard frame a value circuit is extended to said coding circuits in accordance with the said selected level of said elongated circuit bars and are caused thereby to be translated into coded circuit selections of the said punch magnets.

10. A data storing and readout device of the character described comprising a stationary framework formed of insulating material, a set of linear electrical conducting strips mounted therein in superposed spaced levels and electrically insulated from one another, each strip representing a predetermined value and being provided with a plurality of integral contact teeth each representing a different denominational order, a framework slidably mounted upon said stationary framework, a set of contact bars vertically mounted on said slidable framework each bar related to a different order of said contact teeth and being electrically insulated from one another, a plurality of storage members adjustable to predetermined value positions, contact wipers mounted thereon each wiper being related to a different order and positioned adjacent but normally out of contact with the related orders of said contact bars and said contact teeth, and wherein a displacement of the slidable framework will act to move the contact bars laterally into mechanical and electrical engagement with said wipers and to move said wipers into selective engagement with the related contact teeth in accordance with a predetermined setting of said contact wipers.

11. The invention in accordance with claim 10 and wherein the said contact wipers include an elongated arm attached to the settable member and having a reentrant free end portion forming an acute angle with said elongated arm and offset therefrom by a yieldable arcuate area of said arm.

12. The invention in accordance with claim 11 and wherein said contact wipers are displaced to selective positions by the said adjustment of the settable members in an arc common to the pivot center of said settable members, and wherein said wipers are adapted for lateral displacement thereafter in an arc about the pivot point of attachment of said elongated arm with the related settable member and into engagement with a selected contact member of said groups by the said lateral displacement of said contact bars.

13. The invention as set forth in claim 12 and wherein each of the vertical contact bars is formed as an arc segment substantially coincident with the arc as transcribed by the movement of the related contact wipers in the adjustment of the storage members to value set positions, and wherein the said bars are within the radius length of the said contact wipers, and wherein the contact teeth for the different levels of said conducting strips are of graduated length in accordance with the superposed linear spacing between the said conducting strips so that the said contact teeth extend uniformly within the arc transcribed by the said contact wipers in the said movement thereof to value set position.

14. The invention in accordance with claim 10 and wherein the said contact wipers include an elongated arm attached at one end to the settable member and having a reentrant free end portion extending approximately parallel to said elongated arm and offset therefrom by a yieldable arcuate portion of said arm.

15. In an apparatus of the character described, the combination comprising registering and printing devices, a plurality of differentially movable reciprocatory actuators therefor, a plurality of item selecting members, cyclic operating devices, a plurality of settable members selectively displaceable to a plurality of well-defined positions in accordance with a forward movement of said actuators, a contact wiper mounted upon each denominational order of said settable members for adjustment therewith and electrically insulated thereof, locking means adapted to maintain the settable members in set position throughout a return movement of said reciprocatory actuators, switchboard devices associated with said wipers for translating selective positions of said settable members into selective electrical circuits including a stationary frame having a plurality of mutually insulated contact strips mounted thereon and each having a contact element in relation to each order of said contact wipers, a slidable frame having mounted thereon an elongated contact bar related to each of said contact wipers and insulated from one another, and wherein said contact wipers are spaced between the said contact bars and related contact element in such manner that selective displacement of said wipers is effected without frictional engagement therewith, and wherein a subsequent longitudinal displacement of the said slidable frame relative to the said stationary frame effects displacement of said elongated contact bars into engagement with the said contact wipers in any set position of said wipers, and wherein a continued movement of said contact bars thereafter effects a lateral displacement of the contact wipers into engagement with the related order contact element in accordance with a set position of said contact wipers, means for effecting engagement of said locking means with said settable members and for concurrently effecting a displacement of said shiftable frame, means adapted for releasing said locking and displacement means to restore said switchboard frame and said locking means following a return movement of the actuators whereby the settable members are released to restore said contact wipers free of frictional engagement with said bars and said contact elements, tape perforating means including a plurality of punches and dies, punch operating magnets, tape transport means, cyclic operating means for effecting a punching operation including the punching and transport of said tape, and wherein the said engagement of said wipers with a selective contact element will act to control operations of the related punch magnets during said return movement of the actuators.

16. The invention according to claim 15 and including an impulse distributor operated in timed relation with cyclic operations of the said tape perforating means and adapted for establishing selective circuit control to the said switchboard devices, and wherein said selective circuits are adapted in timed relation with perforating operations of the tape punches by the said punch cyclic [operating] *operating* means to effect in each successive denominational orders of said switchboard devices an operation of the punch magnets in accordance with a selective displacement of said contact wipers by the said settable members.

17. The invention in accordance with claim 16 and wherein the said impulse distributor includes a sequence switch provided with a plurality of contact pins each electrically connected with a denominational order contact bar of the shiftable switchboard frame, an impulse arm indexed in timed relation with each cyclic operation of the tape perforating devices and adapted to successively establish circuit control to each order of said contact bars, magnetic means adapted for effecting said operations of said arm, and wherein said circuits are extended from said bars in accordance with the set positions of said settable members to effect a successive selective control of said punch magnets in timed relation with the said cyclic operations of the tape punches.

18. In an accounting machine having cyclic operating means, registering and printing devices, a work support carriage adapted for movement to a plurality of columnar positions relative to said printing devices, a plurality of differentially movable reciprocatory actuators for said registering printing devices, a plurality of item selecting members including value determining and symbol selection keys, a plurality of item storage members selectively settable during a forward movement of said actuators to well-defined positions in accordance with a selective operation of said value and said symbol keys; the combination therewith of punch means for effecting perforations upon a tape in accordance with items stored upon said storage members, punch control magnets, readout means for translating the set positions of said storage members into electrical control circuits for selectively effecting operations of said punch magnets, a contact wiper mounted upon each of said storage members for adjustment therewith to said set positions, a switchboard including a stationary frame, a plurality of electrical circuit strips mounted thereon and spaced in relation to the settable positions of said contact wipers, and wherein the said circuit strips are provided with a plurality of contact areas each being adjacent and normally out of engagement with a related order of said contact wipers whereby said adjustment of said wipers is effected free of frictional engagement with said contact areas, a shiftable frame provided with a plurality of contact bars each adapted for cooperation with a related wiper in any said set positions thereof, said bars being adjacent but normally out of contact with related orders of said wipers and free of engagement with said wipers during the said adjustment thereof, means for holding the storage members and said contact wipers in set position, means operable under control of the cyclic devices of the accounting machine and adapted to effect operation of the said holding means and to cause also a displacement of the said shiftable frame, and wherein said contact bars are moved with said frame into mechanical and electrical engagement with the said contact wipers for moving said wipers into engagement with selected contact members, whereby a circuit is controlled to the related punch control magnets in accordance with the set positions of said wipers, cyclic means for effecting a perforating operation of any active punches, a circuit distributor switch movable in step by step manner for effecting circuit to successive orders of said contact bars, a magnet to advance said switch one step, and circuit control means for said magnet including a switch operable by the punch cyclic means during successive punching cycles of operations and adapted for controlling operation of the distributor switch in a timed relation with the said successive punching cycles of operation in such manner that items stored within the storage devices are read out of successive orders thereof during the said successive punching cycles of operation.

19. The invention in accordance with claim 18 and having a plurality of manual control keys for effecting selective operations of the registering printing devices said control keys being provided each with a contact switch member adapted upon an operation of the related control key to selectively extend a control circuit to related punch magnets of the tape perforating means, and wherein the said circuit distributor switch includes a contact pin having a circuit connection in common with said contact switches of said control keys, a magnetically operated switch in said common circuit, a control switch operable in a movement of the record carriage to a selective columnar position to close the circuit and effect operation of said magnetic switch, and wherein such operation of the distributor switch [wtih] *with* the record carriage in said selective columnar position thereupon effects an operation of selective of said punch magnets in accordance with an operation of said selective manual control keys.

20. The invention according to claim 19 and including a magnetic switch operable in an operation of the related manual control key for the registering printing means and having a set of normally open contact members in the circuit between said contact pin and punch selecting magnets related to said control key, and wherein said magnetic switch includes a holding circuit controlled in an operation thereof to maintain said switch in operated condition whereby circuit is maintained to the said punch magnets following a release of said manual operation control key.

21. The invention set forth in claim 20 and including a circuit holding switch operable by the magnetic switch means controlled by the record carriage operated switch member in a movement of the record carriage to a selective columnar position, and wherein the said holding switch will act to hold said magnetic switch in operated condition to maintain circuit to the magnetic switch member related to said operation control key and to the related punch selecting magnets controlled thereby following a release of said carriage operated switch during a subsequent movement of the record carriage.

22. The invention in accordance with claim 21 and having circuit normalizing means including a normally closed contact switch in a terminal circuit lead related to the said magnetic switches, magnetic devices for effecting an operation of said circuit normalizing switch, a control circuit therefor including a normally open switch, and wherein a final step of operation of the said circuit distributor switch effects operation of said control switch to cause a momentary operation of the said circuit normalizing switch to release the said magnetic switches and normalize all circuits controlled thereby.

23. In a machine of the class described having a plurality of item selecting members, a plurality of actuator members adapted for differential movement under control thereof, a plurality of item storage members each selectively displaceable to a plurality of selective positions by the movement of related ones of said actuator members; in combination therewith means for translating each position of said storage members into selective electrical circuits including contact members displaceable to a plurality of well-defined positions by the said displacement of corresponding ones of said storage members, a switchboard having a first panel provided with a plurality of unitary contact elements each one relating to a corresponding one of the said storage members and being coextensive to said movement of said contact members, a second panel provided with a plurality of groups of contacts in which each one of said contacts corresponds to a selective position of the related one of the said selectively displaceable contact members, and wherein one of said switchboard panels is adapted for displacement relative to the other for bringing said unitary contact elements and the selected ones of said contacts of the related groups into engagement with the related contact elements of the corresponding storage members.

24. In a machine of the class described the combination having a plurality of item indicator means and related actuator means therefor adapted for displacing said indicator means to a plurality of selective positions, means for translating each one of said positions of said indicator means into a selective electrical circuit including a contact member displaceable to selective positions with a related one of said indicator means, a switchboard having a first panel provided with a plurality of contact bars each one of which relates to a corresponding one of said contact members, a second panel provided with a plurality of groups of contact pins each group related to a corresponding one of the said contact bars and to the said contact members associated therewith, and wherein one of said switchboard panels is displaceable relative to the other for bringing said contact bars and the said contact members related thereto into mutual engagement with a selective one of the contact pins of the corresponding group.

25. The invention according to claim 24 and read-out means including a sequence switch having a plurality of contact pins each one being in electrical circuit with a related one of the said contact bars, a plurality of electromagnets each one being in common electrical circuit with the correspondingly aligned one of said pins respective to a plurality of said groups, means for effecting a displacement of the movable panel after the item indicator means have been moved to their selective positions and means operable therewith for initiating a readout operation of said sequence switch.

26. In an accounting machine having a plurality of item selecting means, register means, differentially movable actuators and operating means therefor having an initiating stroke and a restoring stroke; in combination an item storage member associated with each one of said actuators and displaceable thereby to selective positions during said initiating stroke, means for retaining said storage members in said selective positions during said restoring stroke, means for translating said selective positions of said storage members into selective electrical circuits including a contact member on each of said storage members and being displaceable therewith to said selective positions, a switchboard having a first panel provided with a plurality of contact bars each one cooperable with a corresponding one of said storage contact members in any position of said storage members, a second panel provided with rows of contact pins wherein each row represents a corresponding selective position of said plurality of storage contact members, and wherein one of said switchboard panels is displaceable relative to the other for bringing said contact bars and the corresponding storage contact members into engagement with selective ones of said rows of contact pins.

27. The invention according to claim 26 and readout means including a sequence switch having a plurality of contact pins each one being in circuit with a related one of said contact bars, a plurality of electromagnets each one being connected in common electrical circuit with a corresponding row of the said contact pins on said second panel, means for effecting a displacement of the movable panel following the displacement of said storage members to their selective positions and means for initiating therewith an operation of said sequence switch, whereby an energizing of the selective electromagnets corresponding to the stored items will be effected in sequential denominational orders.

28. In a machine of the class described having a plurality of item selecting members, a plurality of actuator members adapted for differential movement under control thereof, a plurality of item indicating means selectively displaceable to a plurality of positions by movement of related ones of said actuator members; means for translating each of said positions of said indicating means into an electric circuit including, a resilient contact member selectively adjustable with a related one of said indicating means, and wherein said contact members are displaceable laterally of any said adjusted positions, a plurailty of groups of contacts each group related to one of said resilient contact members and in which each of said contacts corresponds to a selected position of the related resilient contact member, a plurality of contact elements each coextensive to the movement of a related one of said resilient contact members and relatively adjustable with respect to the related group of contacts whereby to effect said lateral displacement of said adjustable contact members so that circuit connections are effected respectively through the related adjusted contact members to the selected contacts of said related groups.

29. In a machine of the class described having a plurality of item indicating means and related actuator means for adjusting each selectively to a plurality of positions; means for translating each of said positions of said indicating means into an electric circuit including, a resilient contact member selectively adjustable with each of said indicating means, and wherein said contact members are adapted for lateral displacement relative to said adjusted positions thereof, a plurality of groups of stationary contacts each group related to one of said resilient contact members and in which each of said stationary contacts corresponds to a selected position of the *related* resilient [related] contact member, a plurality of shiftable contact elements each coextensive to the movement of one of said resilient contact members and relatively adjustable with respect to the related group of stationary contacts, and means for relatively adjusting said shiftable contact elements whereby to effect the said lateral displacement of the said resilient contact members to make connections respectively through the related said selectively adjusted contact members with the selected stationary contacts of said related groups.

*30. Apparatus for providing a recording of data as perforations on an information media including a plurality of first members disposed for movement from a reference position to selective positions corresponding to a selected set of data to be recorded on said information media, reciprocatory operating means for effecting said movement of said first members, a corresponding plurality of electrically conductive resilient brush members each one independently displaceable freely with said first members to corresponding selected data positions, circuit control devices arranged relative to said brush members to selectively establish electrical connections therewith in accordance with the individual positions of said brush members as determined by the selected data positions of said first named members, control means operable following forward movement of said first members and adapted for effecting flexing engagement and disengagement of said circuit control devices with the brush members at any position of said brush members, and punch means responsive to operation by said engagement of said circuit control devices with the said brush members including a sequence switch controlled by said punch means for sequentially recording corresponding data in accordance therewith as information upon a record media.*

*31. Apparatus for controlling the recordation of data as perforations on a record media including, a plurality of denominational order members each independently selectively operable for reciprocatory actuation to selected digit value positions, cylic means for effecting operations thereof, a plurality of electrically conductive wipers adapted each for independent movement together with related ones of said members upon forward actuation thereof to corresponding selected value positions, selective value circuit means disposed normally free of said wipers and arranged relative thereto to establish selec-*

*tive electrical connection with corresponding ones of said wipers according to the selected value positions of said denominational order members, means operable under control of said cyclic means following the forward movement of said denominational order members and adapted for effecting flexing engagement and disengagement of said wipers with said circuit means in any selected value position of said wipers, punch means responsive to the engagement of said wipers with said circuit means for recording corresponding value perforations as data on a record media, and sequence switch means operable under control of said punch means whereby data perforations in accordance with said engagement are effected in successive manner independently of said cyclic means.*

*32. An apparatus for recording data as perforations on a record media comprising in combination a plurality of item selecting members, a plurality of differentially movable members arranged in denominational order and each one adapted for reciprocatory adjustment independently of the other whereby each may be set to selective value positions in accordance with a selective setting of related ones of said item selecting members; readout devices for translating any selected positions of said movable members into selective electric circuits and including a resilient contact wiper freely displaceable with related ones of said movable members to corresponding selected value positions, circuit control means disposed relative to said contact wipers whereby to selectively establish electrical connections therewith according to the selected positions of said differentially movable members, means operable for effecting flexing engagement and disengagement of said circuit control means with the corresponding contact wipers following a displacement of said wipers to selected value positions, a sequence control means for reading out successive ones of said contact wipers in corresponding value electrical impulse signals in accordance with the positions of said contact wipers, and punch means responsive to said signals for sequentially recording information on a record media in accordance therewith, and means operable by said punch means for controlling successive operations of said sequence control means.*

*33. For an accounting machine or the like having a plurality of item selecting members, registering and printing devices, differentially movable reciprocatory actuators therefor, and cyclic operating devices; the combination therewith of, means for recording data as perforations on a record media including, resilient brush members each one freely and independently displaceable to selective value positions with related ones of said actuators during forward stroke movement thereof, selective circuit means disposed relative to said brush members for establishing selected electrical connections therewith according to the individual positions of said brush members, means operable under control of said cyclic devices following said forward stroke adjustment of the actuators for effecting flexing engagement and disengagement of said brush members with selected ones of said circuit means, and punch means responsive to operation by said engagement of said circuit means with any selected ones of said brush members including a sequence switch for sequentially perforating data in accordance therewith as information upon a record media, and means operable by said punch means for effecting independently of the cyclic devices successive operations of said sequence control means.*

*34. In a machine of the class described for recording information as perforations upon a record media the combination comprising, a plurality of item selecting members, a plurality of reciprocatory actuator members adapted for displacement to selective positions under control of said selecting members, a plurality of item indicating means selectively displaceable to a plurality of positions by movement of related ones of said actuator members, readout means for translating the positions of said indicating means into selected electric circuits including a contact wiper selectively adjustable freely with a related one of said indicating means, a plurality of groups of contacts each group related to one of said contact members and in which each of said contacts corresponds to a selected position of the related contact member, control means operable following an adjustment of said actuators to any selected positions and adapted for effecting flexing engagement and disengagement of the said contact wipers with related selected ones of said groups of contacts, sequence means for reading out successive groups of said contacts to effect control circuits in accordance therewith, and punch means responsive to operation by said control circuits for recording corresponding data in accordance therewith as perforations upon a record media, and in which said punch means effects operation of said sequence means following each successive punching operation.*

*35. In a business machine or the like having a plurality of item selecting members, a plurality of differentially movable reciprocatory actuators, cyclic operating devices, a plurality of settable members adjusted to selective positions by the differential actuators in a forward movement thereof and means for holding said members in adjusted position during return movement of said actuators; in combination therewith an electric circuit control means for translating well defined positions of the said settable members into selective electric circuits including a plurality of groups of circuit contact members each group related to a corresponding orders of said settable members, a shiftable frame including a plurality of spaced bars, a single arm contact wiper displaceable with each of said settable members, and wherein said contact wipers are spaced between the said bars of said frame and the related group of contact members for individual selective displacement by said settable members without frictional engagements with said frame and said contact members, and wherein subsequent displacement of the movable frame effects engagement of said wipers into circuit engagement with a selected related contact member in accordance with the individual selective displacement of said settable members, punch members selected in accordance with said displacement of said settable members, and sequence means therefor operable in an operation of said punch members independently of the cyclic devices.*

*36. In an apparatus of the character described, in combination an accounting machine including a plurality of item selecting members, a plurality of differentially movable reciprocatory actuators, cyclic operating devices, a plurality of ordinally disposed members settable to selective positions by the differential actuators during a forward stroke movement thereof, locking means adapted under control of the cyclic operating devices for retaining said ordinally disposed members in set condition during a return movement of said actuators and for releasing said members following said return movement; perforating means including a plurality of punches, punch selecting magnets and cyclic means for effecting a punching operation of any secured punches; a transducer between the accounting machine and the perforating means adapted to convert any seleoted pcsitions of the ordinally disposed members into electrical circuits for effecting selective operation of the said punch magnets including a group of selective circuit contacts related to each order of said members, a shiftable frame, a resilient contact wiper spaced between each group of said selective circuit contacts and said shiftable frame and displaceable in accordance with an operation of the said ordinally disposed members independently of frictional engagement with said frame and said circuit contacts, and wherein a subsequent operation of said frame will effect engagement of said wipers with selected ones of said contact members*

*for selectively effecting operation of corresponding ones of said punch selecting magnets.*

References Cited in the file of this patent or the original patent

UNITED STATES PATENTS

| | | |
|---|---|---|
| 1,166,517 | Goldberg | Jan. 4, 1916 |
| 1,834,561 | Watson | Dec. 1, 1931 |
| 1,965,884 | Crosman | July 10, 1934 |
| 2,074,006 | Von Pein | Mar. 16, 1937 |
| 2,121,227 | Haegele | June 21, 1938 |
| 2,146,283 | Bryce | Feb. 7, 1939 |
| 2,240,549 | Carroll | May 6, 1941 |
| 2,241,548 | Frischknecht | May 13, 1941 |
| 2,285,353 | Peirce | June 2, 1942 |
| 2,364,207 | Ghertman | Dec. 5, 1944 |
| 2,490,348 | Ghertman | Dec. 6, 1949 |
| 2,493,709 | Wittenmyer | Jan. 3, 1950 |
| 2,540,029 | Hamilton et al. | Jan. 30, 1951 |
| 2,550,133 | Allan | Apr. 24, 1951 |
| 2,733,008 | D'Andrea et al. | Jan. 31, 1956 |
| 2,861,739 | Chall et al. | Nov. 25, 1958 |
| 2,895,121 | Bliss | July 14, 1959 |
| 2,927,729 | Boyden et al. | Mar. 8, 1960 |